United States Patent [19]
Belser et al.

[11] Patent Number: 5,793,555
[45] Date of Patent: Aug. 11, 1998

[54] SEEK OPTIMIZATION FOR DISK FILES WITH SIDE-BY-SIDE HEAD

[75] Inventors: Karl Arnold Belser; Louis Joseph Serrano, both of San Jose, Calif.

[73] Assignee: International Business Machines Corporation, Armonk, N.Y.

[21] Appl. No.: 766,010

[22] Filed: Dec. 13, 1996

[51] Int. Cl.$^6$ .................................... G11B 21/02
[52] U.S. Cl. .................. 360/75; 360/61; 360/78.01
[58] Field of Search ...................... 360/75, 69, 31, 360/51, 77.06, 77.04, 78.01, 105, 106, 55, 61, 62, 63, 64, 76

[56] References Cited

U.S. PATENT DOCUMENTS

| | | | |
|---|---|---|---|
| 4,439,800 | 3/1984 | Powell | 360/78 |
| 4,679,103 | 7/1987 | Workman | 360/77 |
| 4,894,599 | 1/1990 | Ottesen et al. | 318/636 |
| 5,218,496 | 6/1993 | Kaczeus | 360/106 |
| 5,229,901 | 7/1993 | Mallary | 360/104 |
| 5,268,804 | 12/1993 | Wallis | 360/78.04 |
| 5,331,492 | 7/1994 | Komai et al. | 360/77.06 X |
| 5,459,624 | 10/1995 | Erickson et al. | 360/77.02 |

FOREIGN PATENT DOCUMENTS 59-65975 4/1984 Japan.

*Primary Examiner*—Muhammad N. Edun
*Attorney, Agent, or Firm*—John H. Holcombe

[57] ABSTRACT

Method and apparatus are disclosed for a data recording disk file having a head module with separate side by side read and write transducers for optimizing the switching of the head between reading information and writing information on the same track or cylinder. A function generator defines at least one control function for a servo control signal to drive an actuator to move the head module the approximate distance between the side by side write and read transducers, optimized to minimize the time between write and read, and optimized to move the head module the approximate distance between the side by side read and write transducers at the timing best suited to minimize the write transition time. The disclosed method and apparatus additionally comprises defining at least one family of control functions, the family of functions optimized to account for the latency time between write and read for selected angular distances (skew) between the ending of the data being written and the start of the data to be read, and vice versa.

14 Claims, 8 Drawing Sheets

SEEK OPTIMIZATION FOR DISK FILES WITH SIDE-BY-SIDE HEAD

TECHNICAL FIELD

This invention relates to digital control systems for read/write head positioning in data recording disk files and more particularly, the invention relates to positioning a head having side-by-side write and read transducers.

BACKGROUND OF THE INVENTION

Disk files are information storage devices which utilize a rotatable disk with concentric data tracks containing the information and a head for reading or writing data onto the various tracks. Modern disk files of high data densities employ heads having a magnetoresistive read transducer and an inductive write transducer, called an "MR head". The transducers are presently placed one behind the other in the direction of travel of the data tracks. Such files also have an actuator connected by a support arm assembly to the head for moving the head to the desired track and maintaining it over the track centerline during read or write operations. The movement of the head to a desired track is referred to as track accessing or "seeking", while the maintaining of the head over the centerline of the desired track during a read or write operation is referred to as "track following". In disk files having information recorded on more than one surface and on more than one disk, the heads are arranged in a comb structure so as to be stacked and positioned over the same track on each disk surface. The set of stacked tracks is termed a "cylinder".

In disk files which have a relatively high density of data tracks on the disk, it is necessary to incorporate a servo control system to efficiently move the head(s) between tracks (cylinders) and to maintain the selected head precisely over the centerline of the desired track during read or write operations. This is accomplished by utilizing prerecorded servo information either on a dedicated servo disk or on sectors angularly spaced and interspersed among the data on each surface of the data disk. The servo information sensed by the read/write head (or the dedicated servo head if a dedicated servo disk is used) is demodulated to generate a position error signal (PES) which is an indication of the position error of the head away from the nearest track centerline. The detected information may also include the cylinder number or other indicator of radial/circumferential position, generally referred to as "position sample."

In a disk file digital servo seek control system, a microprocessor utilizes a control signal algorithm to calculate a digital control signal based upon the present position of the head, such as PES and position sample, and the position of the target cylinder, which control signal will operate the VCM to reposition the head at the target cylinder and track (seek). The digital control signal is converted to an analog signal and amplified to provide input current to the VCM. Such a digital servo control system is described in assignee's U.S. Pat. No. 4,679,103, and is a system which provides, at discrete sample times, digital values corresponding to the PES and position sample, and computes, through the use of a state estimator algorithm, a digital control signal. The digital control signal is then converted to an analog signal to provide a power amplifier control signal, which then generates the VCM input current.

In an MR head, the inductive write transducer has roughly the form of a horseshoe magnet. The open end of the horseshoe faces the disk surface with the legs aligned along the track, one leg ahead of the other, so that as the disk spins, each magnetic transition encountered by the head will at some point be located between the legs. In modern disk drives, the head is fabricated in a photolithographic process substantially the same as that employed to make conventional integrated circuits, with one leg or "lower pole piece" of the horseshoe being laid down in one fabrication layer while a spacer and the other leg or "upper pole piece" are laid down in subsequent fabrication layers. The layers are oriented so that the thickness direction is the circumferential direction along the disk track. If the second, magnetoresistive read transducer is to be spaced further along the track, therefore, it must be deposited in higher lithographic layers, whose contents are determined in separate masking steps at a different substrate depths. Proper alignment of the heads thus becomes a problem of mask alignment. The smaller the track pitch, the more severe the alignment requirement is.

Another problem encountered by depositing the transducers in higher lithographic layers is keeping the layers level and even without skew due to accumulated unevenness of the preceding layers.

A solution to these problems is to place the transducers "side-by-side", i.e., radially displaced, so that they are located over different tracks. An example of a side-by-side head is illustrated in U.S. Pat. No. 5,229,901, assigned to Digital Equipment Corporation. In that patent, there is a description of the servo system in which the servo information read on one track by the read transducer is used to position the write transducer over a different track.

Although such a system may be workable, it leads to another major problem in modern disk drives which problem is not discussed in the patent. Specifically, computers to which modern disk drives are attached most often read data sequentially from the disk drive, and often modify the data just read, and then rewrite the data. Computers also often check the data written by reading the data to verify that it was written correctly. This requires that the drive constantly switch between read and write modes on the same track. The problem caused by a side-by-side head is that the transducers are spaced from one another in the radial direction with respect to the tracks so that the transducers are many tracks apart. This transducer arrangement is best suited to a constant write mode or constant read mode and cannot be easily switched between reading and writing on the same track.

A seek servo of the type described with respect to the '103 patent may be used to reposition the head transducers to the track, but such servo systems, whether analog or digital, are designed to provide the best compromise among various factors.

An example of a factor is the need to reposition the head at any distance ranging from between adjacent tracks to between a cylinder at the inside diameter and a cylinder at the outside diameter.

Another example is the need to reposition the head as rapidly as possible to provide fast access to data.

Still another factor is the need to reposition the head for writing without excessive "settle time". Settle time is not well defined in the art, but essentially includes the time required to bring the head to a stationary position from the seek, including any backwards movement after overshoot. To avoid confusion, the coined terminology "write transition time" will be used. The "write transition time" shall mean the total time required to conduct the seek and enable the head to be able to effectively write. Write transition time also includes the time to quiesce from random transient vibration (RTV), or how the mechanics of the drive actuator and head assembly shake when arriving on track. The write transducer is wider than the read transducer so that the read process is more robust than the write process in that the read process can tolerate more RTV and still be "on track". Also, if the write head is too far from the track center while writing, the data on adjacent tracks can be damaged. To prevent this, the write is inhibited if too much off track motion is detected. The read can cause no damage, so more off track motion is allowed.

The use of profile generators to provide seek profiles for setting different profiles in accordance with whether a seek distance is long or short is known, as described in Japanese published patent application 57-175043. U.S. Pat. No. 4,439,800, assigned to Iomega Corporation, is similar, assembling various stored profiles based upon the distance of the seek. However, such seek profiles are again limited by the considerations as described above. The basic reason is that the seeks are spread over a wide range of distances and are used for accessing the head to tracks without considering whether the head will be switched from read to write or vice versa.

An expansion of the "one track seek" servoing, commonly used in many disk drives, might be attempted to reposition the head transducers to the track. A one track seek comprises repositioning the head within one track width as required, for example, when the drive switches from a head on one disk surface to a head in the same cylinder on a different disk or disk surface. The offset of the tracks on different surfaces may be due to thermal effects, or spindle tilt, or other problems. Similarly, when a "one-behind-the-other" conventional head arrangement is used, the misalignment of the transducers requires a one track seek when the head is switched from read to write. Such systems add feedforward pulses to the regular seeking closed loop control. At the start of the seek, the distance to target is calculated, the desired velocity is determined, and from this the velocity error. This error is filtered to obtain the control. But the resulting seek based on the regular closed loop is not fast, since the closed loop is designed to work well for all seek lengths. To improve the speed, a set of predetermined feedforward pulses are added to the control signal. For example, a first pulse is added at the first sample time, a second pulse at the second sample time, and a third pulse at the third sample time. To compensate for the various seek lengths, the feedforward pulses are scaled accordingly. For example, if the predetermined value of the first pulse is P1 and the seek length is only half a track, then the value 0.5*P1 is added to the control when the first pulse is added, instead of P1. The resultant seek thus becomes very fast.

In the typical data recording disk file, the feedforward pulses are designed to switch from one track to the next in the cylinder as rapidly as possible while writing or reading to minimize missed information on the disk due to the rotation of the disk while the heads are being switched, called "skew", and to thereby continue writing or reading a long record that occupies more than one track with a minimum of buffering.

The difficulty in adapting the "one track seek" feedforward pulses to the side-by-side head offset seek is that the control is limited in amplitude by the power amplifier, which would very quickly be driven into saturation by the addition of feedforward pulses scaled for a longer seek, with the result that the seek would be uncontrolled, and hence unoptimized, while the power amplifier was in saturation.

Another servo system is that described in assignee's U.S. Pat. No. 3,838,457, which produces a position error signal of linear slope and is capable of rapidly seeking from a position more than plus or minus a small group of tracks. The linear slope provides a compromise between speed and control for various length seeks and is not optimized for any one seek length.

SUMMARY OF THE INVENTION

Disclosed is a method and apparatus for a data recording disk file comprising at least one head module having separate side by side read and write transducers for respectively reading information and writing information on a corresponding surface of a disk. A function generator defines at least one "optimized control function" for a servo control signal to drive an actuator to move the head module the approximate distance between the side by side read and write transducers, optimized to minimize the time therebetween. A controller selects the function generator to provide the defined control signal upon switching the head module from write to read and from read to write for the track. Additionally, the "optimized control functions" may be optimized, in response to a write to read switching command signal, for driving the actuator to move the head module the approximate distance between the side by side read and write transducers at the timing best suited to minimize the time between write and read; and optimized, in response to a read to write switching command signal, for driving the actuator to move the head module the approximate distance between the side by side read and write transducers at the timing best suited to minimize the write transition time.

The inventive method and apparatus additionally comprises defining at least one family of optimized control functions, the family of functions optimized to account for the latency time between write and read for selected angular distances (skew) between the ending of the data being written and the start of the data to be read, and vice versa. Optimized control functions are sufficiently specialized and complex that they cannot be used generally for all seek distances.

DESCRIPTION

Figure 1:
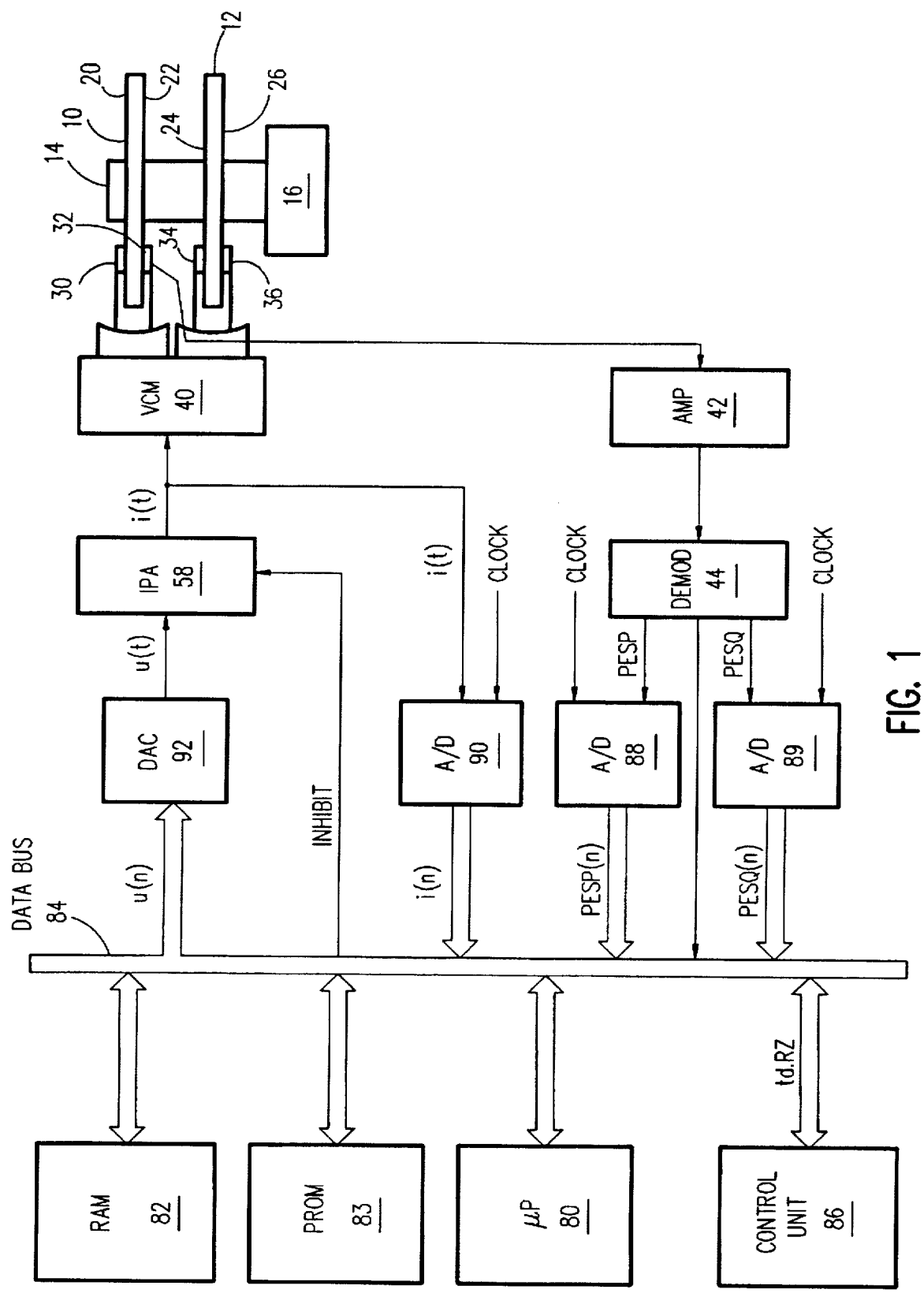
FIG. 1 is a diagram of a data recording disk file and digital servo control system.

Referring first to FIG. 1, there is depicted a simplified block diagram of the data recording disk file and digital servo control system described in U.S. Pat. No. 4,679,103, which is incorporated herein by reference. A pair of disks 10, 12 are supported on a spindle 14 of the disk file drive motor 16. Each of the disks 10, 12 has two surfaces 20, 22 and 24, 26, respectively.

Figure 2:
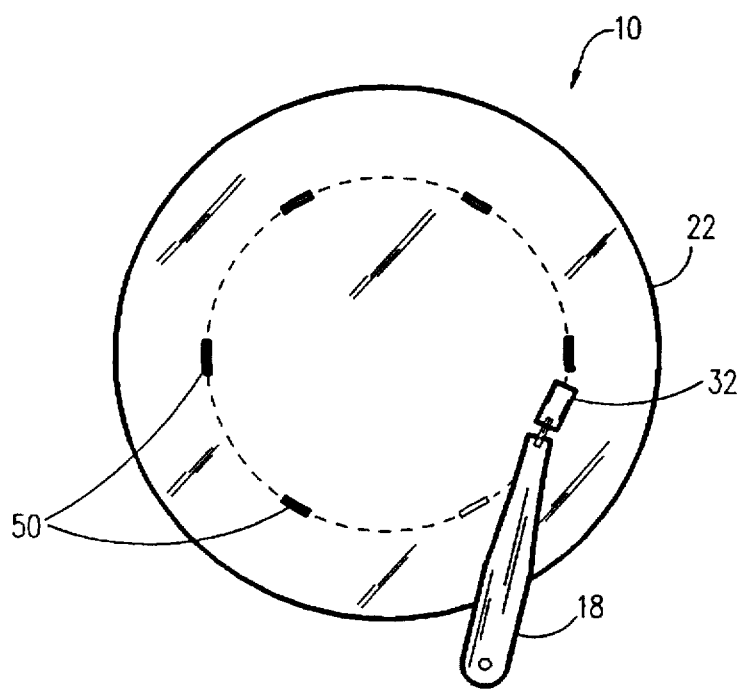
FIG. 2 is a diagrammatic representation of the disk file of FIG. 1.

Referring also to FIG. 2, the servo information on each of the surfaces is recorded in angularly spaced sections along the concentric tracks, with the position information typically written in such a manner that the intersections of adjacent servo tracks in the servo sectors are radially aligned with the centerlines of the data tracks, as shown by servo blocks 50.

The specific tracks on the surfaces of the disk are accessed by heads 30, 32, 34, 36, each of which is associated with a respective disk surface and supported by an associated arm assembly, e.g., arm 18 in FIG. 2. The heads 30, 32, 34, 36, are all maintained in a fixed relationship with one another relative to their radial position on their respective disk surfaces. One of the surfaces may be a dedicated servo surface, or all surfaces may be data surfaces, with angularly spaced servo sectors having the servo information. The servo information read by the servo head or selected head 32 is input to amplifier 42, demodulator 44, and analog to digital (A/D) converters 88 and 89, which supply the head position information. Alternatively, as described in the '103 patent, a digitizing PES channel (DPES) may be used to provide the head position information PESP and PESQ. The DPES presents head position information in a digital word. The discrete values of PESP and PESQ at any sample time are designated PESP(n) and PESQ(n), where n represents a time index for each digital sample.

A microprocessor 80 is connected by data bus 84 and an address bus (not shown) to suitable memory devices, such as read/write memory (RAM) 82 and programmable read only memory (PROM) 83. Microprocessor 80 utilizes a control signal algorithm, as described in the '644 patent, to generate a control signal u(n). The control signal u(n) is output to digital-to-analog converter (DAC) 92 and integrated and amplified by integrating power amplifier (IPA) 58 to generate an analog current i(t) to VCM 40. The analog current i(t) is fed back to A/D converter 90, which provides a digital current signal i(n) to microprocessor 80. Microprocessor 80 thus receives as inputs, at discrete sample times, the digital actuator current i(n) and the digital head position error signals PESP(n) and PESQ(n). Microprocessor 80 computes the actual head position, or position sample, from the values and timing of PESP(n) and PESQ(n), using conventional logic, as described in the '103 patent. Also shown as input to microprocessor 80 via data bus 84 are command signals from the disk file control unit 86.

Figure 3:
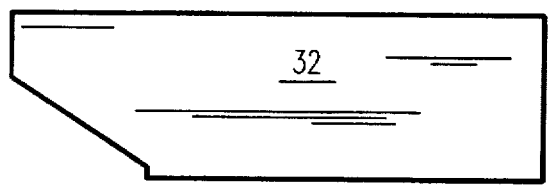
FIG. 3 is a side elevational view of the slider depicted in FIG. 2.
Figure 4:
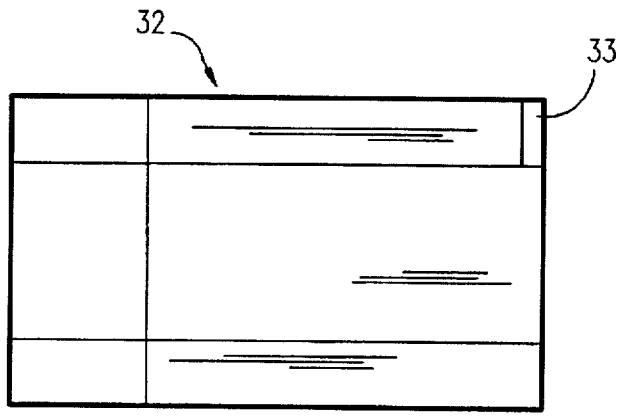
FIG. 4 is a bottom view of the same slider.
Figure 5:
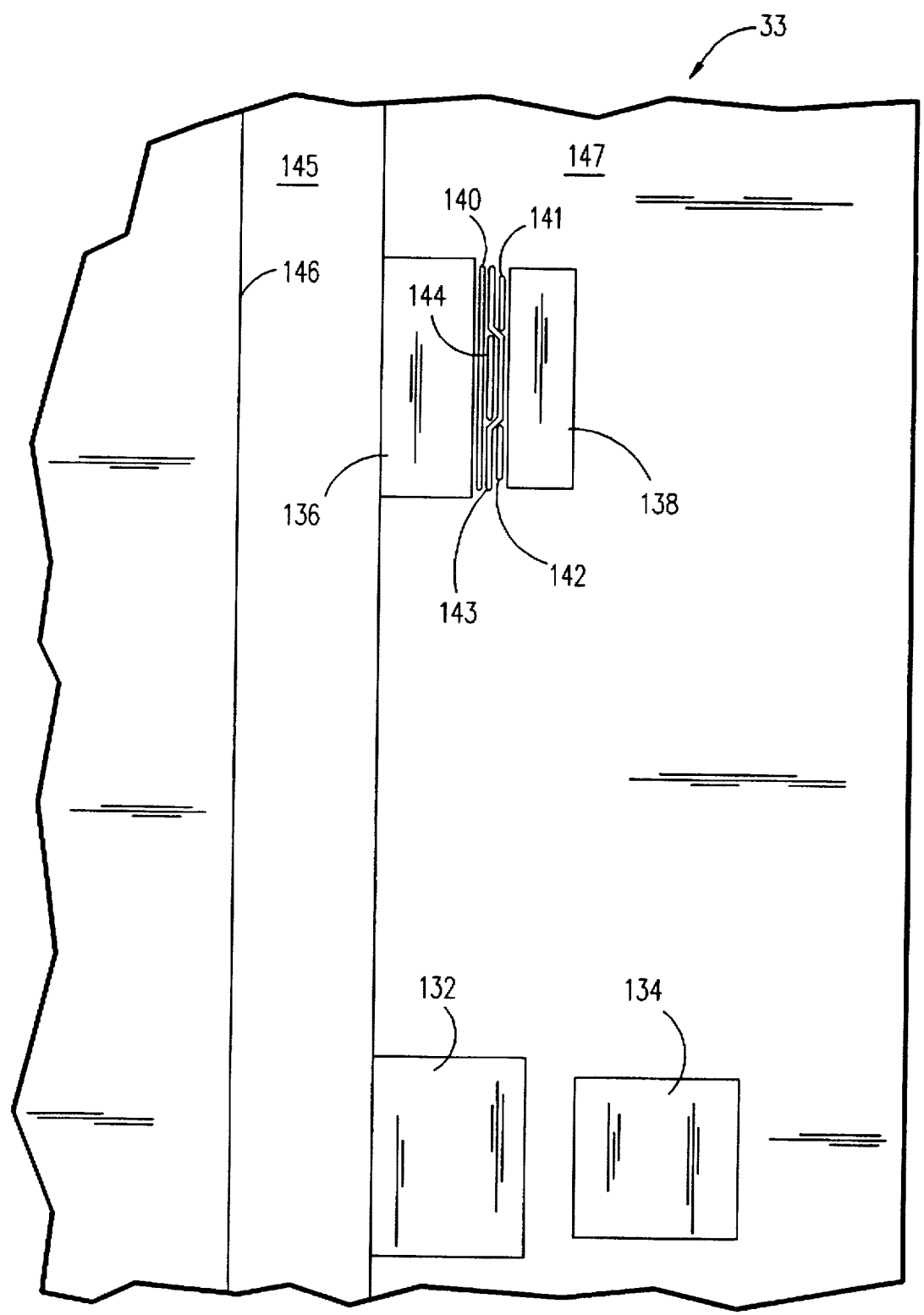
FIG. 5 is a detailed bottom view of the slider of FIGS. 3 and 4.

Referring to FIGS. 3 and 4, the head 32 includes a transducer region 33 photolithographically formed on the rear surface of the head slider, which can be seen more clearly in FIG. 5.

FIG. 5 is a detailed view of the transducer region 33 as it appears from the disk surface, showing side by side read and write transducers. The specific types of transducers and the manner in which they are fabricated do not constitute part of the present invention. An example of side by side transducers is illustrated in the '901 patent, discussed above. The portions of an inductive write transducer shown are the free ends of the pole pieces 132 and 134. Also shown are elements of an exemplary magnetoresistive (MR) read transducer. Shields 136 and 138 are disposed in back and in front, respectively, of a magnetoresistive film 140 so as to minimize the film's receipt of magnetic fields from the diskborne magnetic transitions until those transitions are located just below the film 140. Leads 141 and 142 are connected electrically to the magnetoresistive film 140. A spacer 144 and a magnetic layer 143 define the active region of the transducer, which should be centered on the track centerline. The illustrated arrangement of the transducers may be the same for heads used for both the top and bottom surfaces of the disk, or may be reversed so that one or the other of the transducers is always towards the outer tracks. Present heads having the transducers one behind the other, but that are misaligned, have the heads reversed between the top and bottom surfaces so that the write transducers are aligned towards the outer tracks.

Figure 6:
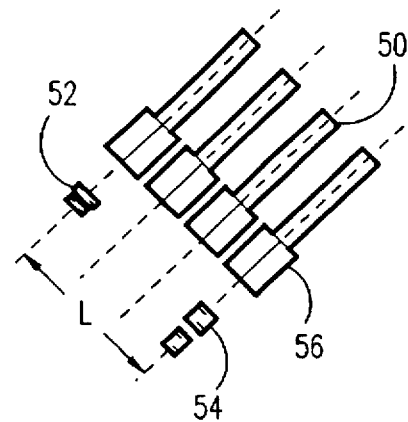
FIG. 6 depicts the transducers of FIG. 5 and tracks on the surface of the disk of FIG. 2.

FIG. 6 depicts the regions on the disk surface 22 represented in FIG. 2 by reference numeral 50. In addition, FIG. 6 depicts the positions 52 and 54 of the read and write transducers, respectively. The track spacing L between the transducers is depicted as being four. In practice, the actual spacing is about 60 microns, which is about 15 tracks for current track pitches.

The '901 patent discusses alignment of the transducers and the servoing of the write transducer using the read transducer to read the servo information 50 from the offset track. Although such a system may be workable for drives which constantly read or constantly write, it leads to another major problem in modern disk drives which problem is not discussed in the '901 patent. Specifically, computers to which modern disk drives are attached most often read data sequentially from the disk drive, and often modify the data just read, checking the data written by reading the data to verify that it was written correctly. This requires that the drive constantly switch between read and write modes on the same track. The problem caused by a side-by-side head is because the transducers are spaced from another in the radial direction the distance L, discussed above, the transducers are many tracks apart. The problem is that the transducers cannot be easily switched between read and write on the same track.

A conventional seek servo of the type described with respect to the '103 patent may be used to reposition the head transducers to the track, but such servo systems are designed to provide the best compromise between various factors, as discussed above.

The examples of factors discussed include: the need to reposition the head at any distance ranging from between different tracks in the same cylinder to between a cylinder at the inside diameter and a cylinder at the outside diameter; the need to reposition the head as rapidly as possible to provide fast access to data; and the need to reposition the head for writing without excessive "write transition time", and without a write inhibit.

The "one track seek" might be attempted to reposition the head transducers to the track. As discussed above, such systems add feedforward pulses to the regular seek closed loop control. But the resulting seek cannot be used for side-by-side head read-write offset repositioning due to the likelihood of saturating the power amplifier and the resultant loss of control.

Referring again to FIG. 1, in accordance with the present invention, and in addition to the conventional control function which uses seek profiles for track-to-track or cylinder-to-cylinder seek operations, at least one "optimized control function" is stored in PROM 83 for handling the special case of a seek equal to the radial displacement between the write and read transducers for read-to-write or write-to-read switches occurring at a same cylinder or track. The optimized control function is optimized to provide feedforward control functions to move the head the distance between the read and write transducers at the minimum time required to make the effective switch between read and write to the same track or the same cylinder. Hereinafter, the term "distance" when referring to the optimized seek of the distance L between the read and write transducers shall mean the approximate distance therebetween. The optimized seek is to the vicinity of the track centerline, preferably less than a half track away, at which time the seek continues, utilizing conventional end of seek (usually track following) servo control to precisely position the transducer at the track centerline. Also, hereinafter, the terms "track" and "cylinder" have somewhat interchangeable meanings. "cylinder" referring to "tracks" on different surfaces at approximately the same radial distance from the center axis. Thus, when referring to the "same track", to the "same cylinder", or to the "current cylinder", the phrase refers to literally the same track, to tracks in the same cylinder on different surfaces, and to the "cylinder increment" to the adjacent cylinder either towards the ID or towards the OD.

This concept of the "same cylinder" is important in that, for example, a long string of data may begin on one track of one cylinder and continue not only to another track of the cylinder, but also a "cylinder increment" from the last track in one cylinder to the first track on the adjacent cylinder. Thus, for example, when the host directs that a data string just written during a cylinder increment is to be read for verification, the write to read mode change for the "same cylinder" is actually to the beginning of the data on the first cylinder.

As a specific example, imagine that the host computer wants to write 4K of data, and the drive starts writing the data with the bottom head, track N. The amount of space left in the track is, say, 2K. Then, upon completing writing 2K, the drive has to do a one track seek to head 0, track N+1, and write the next 2K. Now, when the host wants to read-verify the data, the mode change at the "same cylinder" is not to N+1, the true current cylinder, but to N, a distance equal to the RW offset +/- one track. The probability of this occurring is some fraction of a percent, depending on the number of heads and size of data transfers. (The more heads, the rarer the cylinder increment, the longer the transfer length, the more often.)

In the preferred embodiment, two families of control functions are designed and calculated in advance and stored in PROM 83, the first family of functions optimized to minimize the time between write and read and to take into account any latency due to the angular distances (skew) between the ending of the data being written and the start of the data to be read, and the second family of functions optimized to minimize the write transition time and to take into account any latency due to the angular distances between the ending of the data being read and the start of the data to be written. Microprocessor 80 serves as a function generator by accessing one of the control functions stored in PROM 83 in response to commands from controller 86 and the sector skew between the current sector position and the target sector. Each of the control functions provides input to the microprocessor 80 to generate a servo control signal u(n) to drive the VCM 40 to move the head module the distance between said side by side read and write transducers. The microprocessor 80 responds to the controller 86 switching the head module from write to read or from read to write. The optimized control function in PROM 83 selected in response to a write to read switching command signal on the same cylinder is optimized for driving the actuator to move the head module the distance between the side by side read and write transducers at the timing best suited to minimize the time between write and read, and may take into account the latency time. The optimized control function in PROM 83 selected in response to a read to write switching command signal on the same cylinder is optimized for driving the actuator to move the head module the distance between the side by side read and write transducers at the timing best suited to minimize the write transition time, and may take into account the latency time.

Alternatively, PROM 83 may store an algorithm, or algorithms, used by the microprocessor 80 to compute the appropriate optimized control function.

The specific optimized profiles or algorithms stored in PROM 83 must be designed to be appropriate to the specific characteristics of the actuator and drive. The possible designs are well known and are a matter of choice, using the concepts described in many patents and publications. Examples include assignee's U.S. Pat. No. 4,894,599, which describes a current limiting "deadbeat control" algorithm which reduces settle time; assignee's U.S. Pat. No. 5,268,804, which provides coast algorithms which take into account the data rotational "skew"; and assignee's U.S. Pat. No. 5,459,624, which describes phase plane trajectory trough functions. Another example of an algorithm is disclosed in a publication entitled *Transactions of the Japan Society of Mechanical Engineers*, Part C v 62 n 597, May 1996, pp. 1848–1856, describing a two-degree-of-freedom control.

The steps of the present invention for operating the system of FIGS. 1–6 is illustrated with reference to FIGS. 7–12. The steps in any of the FIGS. 7–12 may be conducted in a different order than illustrated, and the series of steps of the respective figures may also be conducted in a different order than the order of the figures.

As discussed above, computers to which modern disk drives are attached most often read data sequentially from the disk drive, and often modify the data just read, and then rewrite the data. Computers also often check the data written to a track or cylinder by reading same the data back to verify that it was written correctly. This requires that the drive constantly switch between read (R) and write (W) modes on the same cylinder. Also as discussed above, the "same cylinder" has four meanings; 1) a mode switch between read (R) and write (W) or write (W) and read (R) at the same track on the same surface; 2) a mode switch at the same cylinder, but a track on a different surface; 3) a mode switch at the adjacent cylinder towards the outside diameter or OD; and 4) a mode switch at the adjacent cylinder towards the inside diameter or ID.

Figure 7:
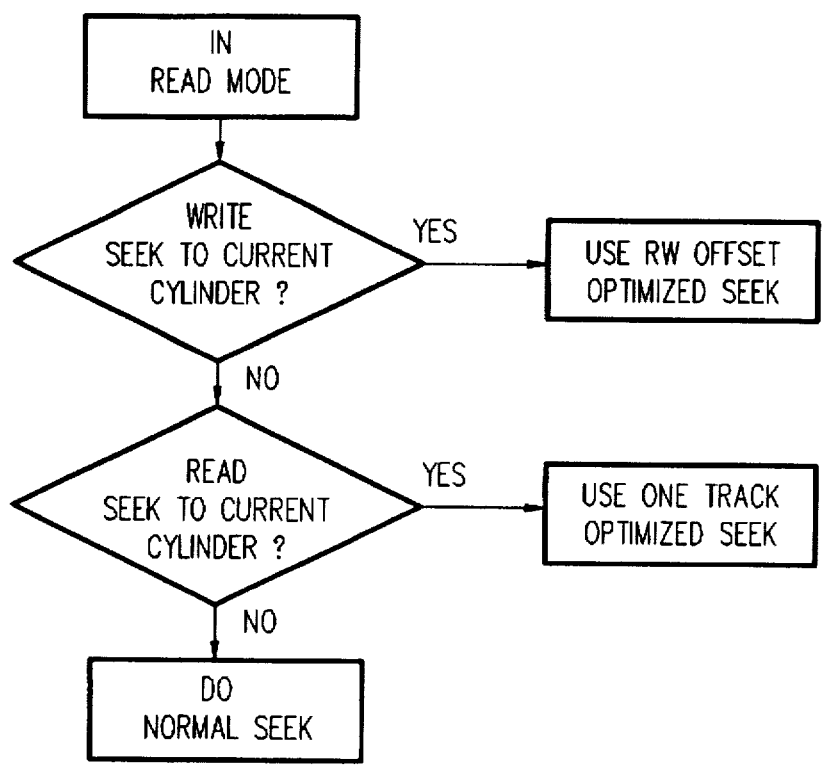
FIG. 7 is a flow chart illustrating the steps in determining the type of seek to conduct when the head is in read mode.

FIG. 7 is a flow chart illustrating the steps in determining the type of seek to conduct when the head is in read mode. The first decision block shown is whether the head is to be switched from read to write at the "same cylinder". If yes, the branch is to the optimized RW seek of the present invention. As will be explained, the optomized seek from the read transducer to the write transducer at the same cylinder is to be used. If no, the next decision block is whether the head requires adjustment to its current radial position to continue reading from the current cylinder. If yes, the conventional "one track seek" will be conducted. If no, the seek is not to the same track or cylinder, and a conventional seek using stored acceleration profiles or a seek algorithm according to known methods is conducted.

Figure 8:
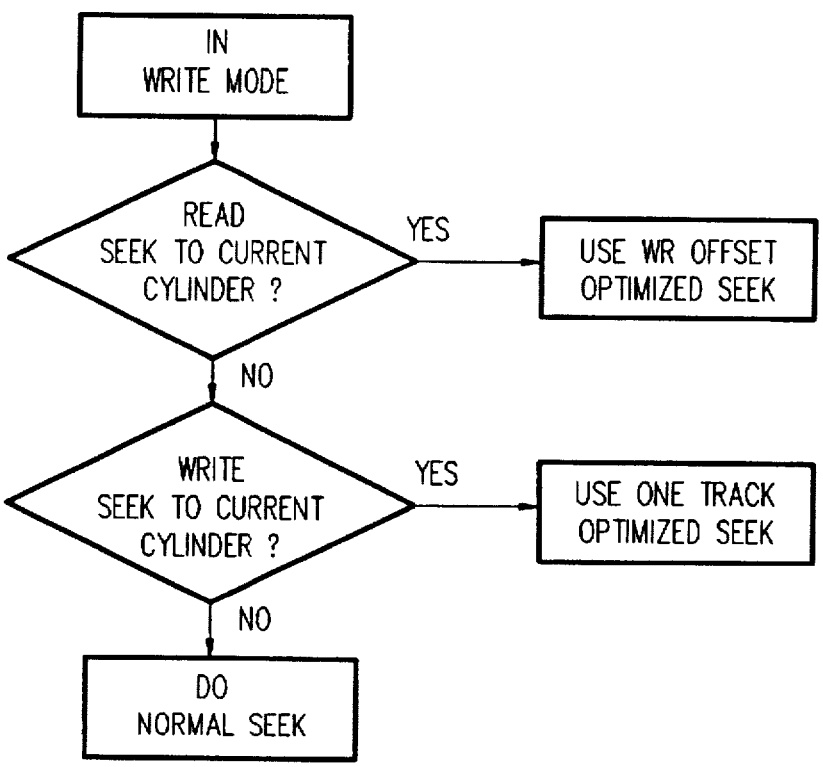
FIG. 8 is a flow chart illustrating the steps in determining the type of seek to conduct when the head is in write mode.

FIG. 8 is a flow chart illustrating the steps in determining the type of seek to conduct when the head is in write mode. The first decision block shown is whether the head is to be switched from write to read at the same track or cylinder. If yes, the branch is to the optimized WR seek of the present invention. As will also be explained, the optimized seek from the write transducer to the read transducer at the same cylinder is to be used. If no, the next decision block is whether the head requires radial adjustment to continue writing to the current cylinder. If yes, the conventional "one track seek" will be conducted. If no, the seek is not to the same track or cylinder, and a normal seek is to be conducted.

Figure 9:
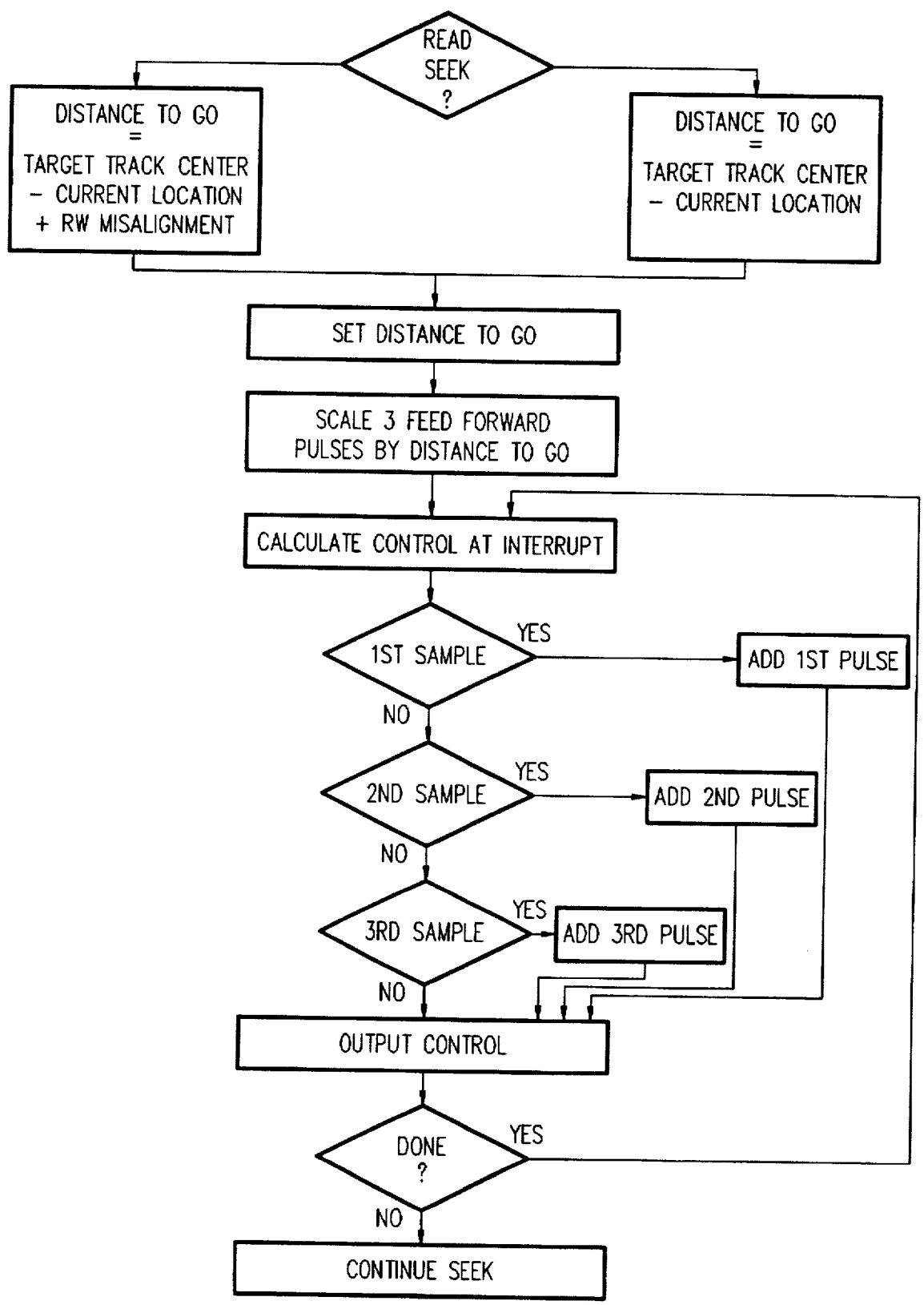
FIG. 9 is a flow chart illustrating the steps of the prior art one track seek.

FIG. 9 is a flow chart illustrating the steps of the prior art one track seek, as entered from FIG. 7 or from FIG. 8. As described above, the effective width of the write transducer is wider than the effective width of the read transducer. Therefore, tracks are typically written at track center to ensure no damage is done to adjacent tracks by overwriting. Also as discussed above, the current "one behind the other" heads have substantial misalignment between the read and write transducers on the head due to manufacturing tolerances, also referred to as R/W offset. Further, the read head reads not only the data, but also the servo signals from the servo sectors. The track following servo is therefore arranged to define the track center as the radial or lateral position on the track at which the write head is centered. The misalignment is generally defined in FIG. 9 as "RW misalignment".

The misalignment is the reason for the first decision block, which determines if the one track seek is a read seek. If yes, the distance to go is the difference between the target track center and the current location (generally within one-half a track) plus the RW misalignment so as to better center the read head. If no, the distance to go is the difference between the target track center and the current location, knowing that the servo is set up for the write head to be centered. The distance to go calculation is important in that not all one track seeks are the same length. Many involve switching from one disk surface to another, and this results in variable seek lengths due to spindle tilt, to thermal effects or to other problems, or due to cylinder increment. Thus, one track seeks are optimized seeks of up to one track.

The distance to go is then set and used to scale three predetermined feedforward pulses. Thus, as described above, if the predetermined value of pulse one is P1, and the seek length is only one half of a track, then the value of P1 is scaled to 0.5*P1.

The control signal is calculated by the microprocessor 80 at an interrupt using the usual, unoptimized, algorithm. The first interrupt sample results in the scaled first pulse being added to the control, etc. The resultant control is output as u(n) to DAC 92, and if not done (if not all the pulses have been added), the next sample is calculated and the next pulse is scaled and added to the control. When done, e.g., all three pulses have been added, the seek is continued with the conventional end of seek, described above.

The term "RW misalignment," above, is used to avoid confusion with the term used in the art of "RW offset", which is not the same as the substantial RW offset between the read and write transducers in the side-by-side heads to which the present invention is directed. The side-by-side heads may also have some slight variation the between heads of corresponding surfaces which requires a similar "RW misalignment" for track following or the conventional end of seek only.

Figure 10:
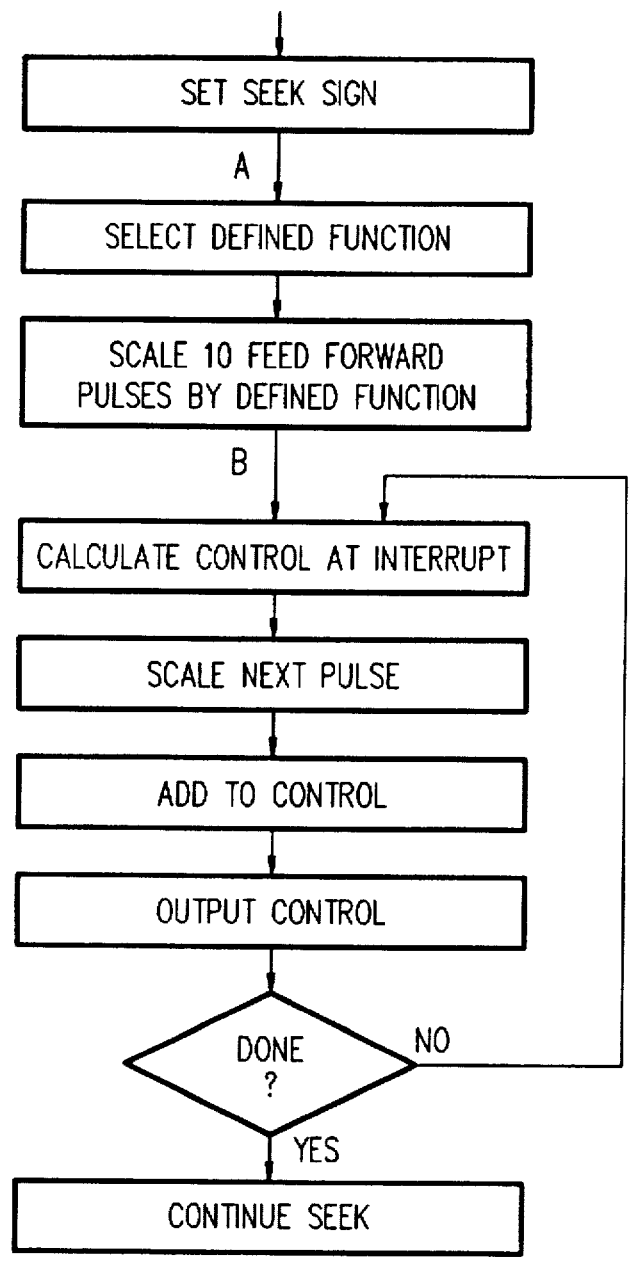
FIG. 10 is a flow chart illustrating the steps for providing the defined control signal of the present invention as used in the data recording disk file of FIGS. 1–6.

FIG. 10 is a flow chart illustrating the steps for providing the defined control signal of the present invention as used in the data recording disk file of FIGS. 1–6. The side-by-side RW or WR offset optimized seek (seek from the read transducer to the write transducer for the same cylinder or seek from the write transducer to the read transducer for the same cylinder) is entered from FIG. 7 or from FIG. 8. The first decision is to determine the direction of the seek, shown as the sign for the control function. The sign depends upon the side-by-side arrangement of the head being used, e.g., whether the read head or the write head is closer to the outer tracks, and upon whether the mode is changing from read to write or from write to read. The next step is to select the defined function for the RW or WR offset ("A" will be described later). As described above, the defined function is a series of scaling factors which determine pulse amplitudes, which function has been previously designed and calculated by any suitable means which will optimize the write to read and write transition times. The defined function may be a single generic function if suitable.

In the preferred embodiment, different defined functions are provided for the read to write optimized seek, and for the write to read optimized seek, and families of functions may be provided to take into account the latency time due to sector skew, as will be described with respect to the following figures. The defined functions are optimized and are therefore complex functions, requiring considerable storage capacity.

Still referring to FIG. 10, scaling factors for ten feedforward pulses are provided by the defined function ("B" will be described later) and the control is calculated at interrupt on a pulse by pulse basis. As each scaled pulse is calculated and added to the control, the control u(n) is output and, if not all the pulses have been output (Done), the next pulse is scaled and output. When done, the seek is continued with the conventional end of seek, described above with respect to "RW misalignment".

Figure 11:
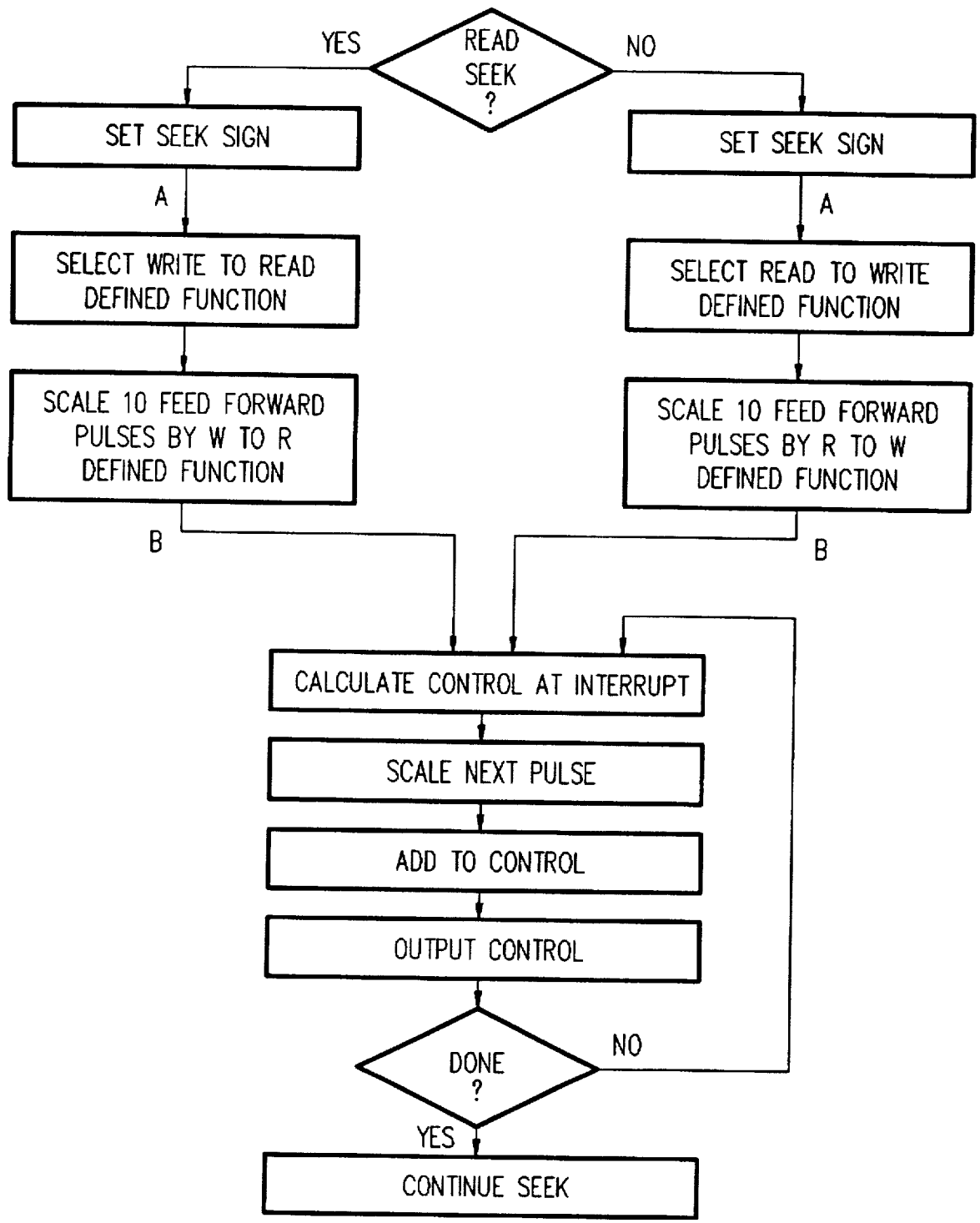
FIG. 11 is a flow chart illustrating the steps for providing defined control signals of the present invention for, respectively, write to read, and read to write, switching for the same track or cylinder.

FIG. 11 is a flow chart illustrating the steps for providing defined control signals of FIG. 10, but specifically selecting a different offset optimized seek for, respectively, write to read, and read to write, switching for the same track or cylinder. FIG. 11 is entered from FIG. 7 or from FIG. 8. Thus, it is known therefrom whether it is a read to write or write to read optimized seek, answering the first decision. If "Yes" (write to read), the first element is to set the seek sign, as described with respect to FIG. 10 ("A" will be described later). Next, a specific write to read defined function is selected. As described above, the write to read function may be designed more aggressively than a read to write due to the fact that no damage can be done to adjacent tracks by reading, and because the read transducer is narrower than the write transducer and can move around within the written track and still read effectively. Scaling factors for ten feedforward pulses are provided by the write to read defined function ("B" will be described later) and the control is calculated at interrupt on the pulse by pulse basis as described with respect to FIG. 10. Again, as each scaled pulse is calculated and added to the control, the control u(n) is output and, if not all the pulses have been output (Done), the next pulse is scaled and output. When done, the seek is continued with the conventional end of seek.

If the "read seek ?" decision of FIG. 11 is "No" (read to write), the sign of the seek is first set, and a specific read to write defined function is selected. The write head can damage data on adjacent tracks if writing is begun too soon, and the write transducer is wider than the read transducer, requiring it to be more precisely centered. Thus, the write defined function must be designed to minimize the total write transition time, taking into account all of the factors discussed above. The scaling factors for ten feedforward pulses are provided by the read to write defined function and the control is calculated at interrupt on the pulse by pulse basis as described with respect to the write to read calculation. Again, as each scaled pulse is calculated and added to the control, the control u(n) is output and, if not all the pulses have been output (Done), the next pulse is scaled and output. When done, the seek is continued with the conventional end of seek.

An example of a side-by-side head for a 3 micron track pitch disk drive, has a write transducer of 2.5 microns, a read transducer of 2.3 microns, and a separation therebetween of 45 microns, or 15 tracks.

Figure 12:
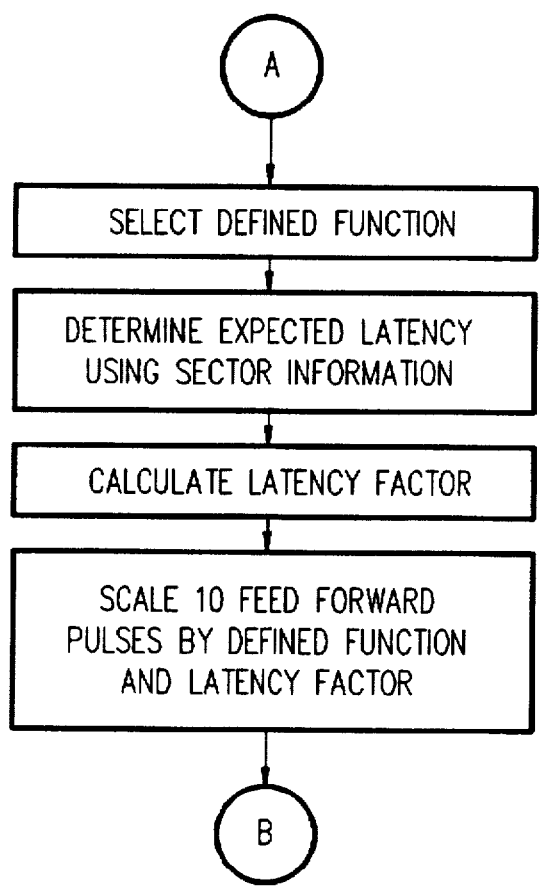
FIG. 12 is a flow chart illustrating the steps for accounting for latency due to the skew between the sectors of the track being switched in the flow charts of FIGS. 10 and 11.

FIG. 12 is a flow chart illustrating the steps for accounting for latency due to the skew between the sectors of the cylinder being switched in the flow charts of FIGS. 10 and 11. The flow chart of FIG. 12 is inserted between labels "A" and "B" in each of the FIGS. 10 and 11. The function of the steps in FIG. 12 is to take into account the latency by providing at least one family of control functions, and preferably two families of control functions. The first family of functions is optimized to minimize the time between write and read for selected angular distances between the ending of the data being written and the start of the data to be read, and the second family of functions is optimized to minimize the write transition time from read to write for selected angular distances between the ending of the data being read and the start of the data to be written.

The first element in FIG. 12 is to select the defined function, either for the optimized transducer switch of FIG. 10, or for the specific write to read optimized defined function or specific write transition optimized defined function of FIG. 11. The next element is to determine the expected latency using sector information. The servo system of FIGS. 1–6 keeps track of the sector number (e.g., address or count) of each sector while detecting the servo information. The sector number conventionally is the count of sectors from an index mark and is often part of the sector servo address information. Thus, the current sector number is known. The sector number of the data to be written or read is a key part of the data address provided to the microprocessor 80 in a read or write request from a host. The data skew, or number of sectors, from the current sector to the target sector can be obtained by subtracting the current sector number from that of the target sector, taking into account the index if it will be passed.

The data skew determines the latency, or time after completing the seek but prior to accessing the data, which may mean that there is additional time allowed beyond the minimum time of the optimized defined functions to reach the target sector. Extra latency time may be used to reduce the control output to save power for the disk drive, which is important for all drives, but is especially important for battery operated drives. Reducing the control output also reduces the excitation of mechanical modes. Alternatively, if the latency is less than the normally selected defined function requires because the target sector is too close, requiring that an entire revolution of the disk will occur before the target sector is reached, the seek can be sped up (at the risk of increased RTV and possible write inhibits) to reach the target faster and to save the disk rotation time for a complete revolution. If the risk is to be avoided, the data skew can be increased by the one revolution.

The latency factors for the different latencies are designed in the same manner as the defined functions described above.

The latency factor is then calculated or selected. The latency calculation may be based upon an algorithm stored in ROM and calculated therefrom. The latency factor may be selected or derived from a lookup table stored on the disk or in ROM 83 and loaded into the microprocessor memory 82.

The feedforward pulses are then scaled by the defined function and by the latency factor. The calculation of the control is then conducted in the steps of FIG. 10 or of FIG. 11, beginning at "B".

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An improved data recording disk file of the type having at least one rotatable disk with generally concentric data tracks on at least one data surface thereof, stacked data tracks on different data surfaces at the same radial distance comprising a cylinder, the data disk or a separate servo disk having servo information recorded thereon; an actuator for seek repositioning a head from one data track to a target data track; a servo system for driving said actuator in a seek mode relating head acceleration to a control signal; a microprocessor for providing said control signal for said seek mode; and a power amplifier for driving said actuator in accordance with said control signal; wherein the improvement comprises:

at least one head module having separate side by side read and write transducers for respectively reading information and writing information during rotation of the disk;

a function generator for defining at least one control function for said control signal to drive said actuator to move said head module the distance between said side by side read and write transducers; and a controller for selecting said function generator to provide said control signal upon switching said head module from write to read or from read to write for the same track or cylinder.

2. The data recording disk file of claim 1, wherein:

said function generator selectively defines control functions for said control signal to drive said actuator to move said head module the distance between said side by side read and write transducers at the timing best suited to minimize the time between write and read or best suited to minimize the write transition time from read to write.

3. The data recording disk file of claim 2, wherein:

said controller additionally provides write to read and read to write switching command signals; and said function generator is responsive to said switching command signals for selectively defining, in response to said write to read switching command signal, a control function for said control signal to drive said actuator to move said head module the distance between said side by side read and write transducers at the timing best suited to minimize the time between write and read; and for selectively defining, in response to said read to write switching command signal, a control function for said control signal to drive said actuator to move said head module the distance between said side by side read and write transducers at the timing best suited to minimize the write transition time from read to write.

4. The data recording disk file of claim 1, wherein:

said controller also provides an indication of the angular location of the start of the data to be read or written upon said switch;

said function generator control functions comprise at least one family of functions, the family of functions optimized to minimize the time between write and read and/or to minimize the write transition time from read to write for selected angular distances between the ending of the data being written or read and the start of the data to be read or written; and said function generator is responsive to said controller selection and to said indication of said angular location, for defining the one of said family of control functions best suited to minimize the time between write and read or best suited to minimize the write transition time from read to write.

5. The data recording disk file of claim 1, wherein:

said data disk has servo information recorded thereon, which servo information is interspersed with said data;

said read transducer of said head module additionally reads said servo information during rotation of the disk, both when said head module is in said read mode and in said write mode;

said servo system additionally includes a servo channel for processing said servo information read by said read transducer to provide head position information (position sample) at discrete sample times, and a seek processor for said microprocessor which calculates from said head position information a distance to go to the target track, and computes said control for said seek mode; and said controller selects said function generator to provide said control signal upon switching said head module from write to read and from read to write for the same cylinder and selects said seek processor for seeks from the current read or write track to another track.

6. The data recording disk file of claim 5, wherein:

said function generator selectively defines control functions for said control signal to drive said actuator to move said head module the distance between said side by side read and write transducers at the timing best suited to minimize the time between write and read or best suited to minimize the write transition time from read to write.

7. The data recording disk file of claim 6, wherein:

said controller additionally provides write to read and read to write switching command signals; and said function generator is responsive to said switching command signals for selectively defining, in response to said write to read switching command signal, a control function for said control signal to drive said actuator to move said head module the distance between said side by side read and write transducers at the timing best suited to minimize the time between write and read; and for selectively defining, in response to said read to write switching command signal, a control function for said control signal to drive said actuator to move said head module the distance between said side by side read and write transducers at the timing best suited to minimize the write transition time from read to write.

8. The data recording disk file of claim 7, wherein:

said controller also provides an indication of the angular location of the start of the data to be read or written upon said switch;

said function generator control functions comprise two families of functions, the first said family of functions optimized to minimize the time between write and read for selected angular distances between the ending of the data being written and the start of the data to be read, and the second said family of functions optimized to minimize the write transition time from read to write for selected angular distances between the ending of the data being read and the start of the data to be written; and said function generator is responsive to said switching command signals for selecting, in response to said write to read switching command signal and to said indication of said angular location, the one of said first family of control functions best suited to minimize the time between write and read; and in response to said read to write switching command signal and to said indication of said angular location, the one of said second family of control functions best suited to minimize the write transition time from read to write.

9. The data recording disk file of claim 5, wherein:

said controller also provides an indication of the angular location of the start of the data to be read or written upon said switch;

said function generator control functions comprise at least one family of functions, the family of functions optimized to minimize the time between write and read and to minimize the write transition time from read to write for selected angular distances between the ending of the data being written or read and the start of the data to be read or written; and said function generator is responsive to said controller selection and to said indication of said angular location, for defining the one of said family of control functions best suited to minimize the time between write and read or best suited to minimize the write transition time from read to write.

10. In a data recording disk file of the type having at least one rotatable disk with generally concentric data tracks thereon, stacked data tracks on different data surfaces at the same radial distance comprising a cylinder, the data disk or a separate servo disk having servo information recorded thereon; at least one head module having separate side by side read and write transducers for respectively reading information and writing information during rotation of the disk; a controller for switching said head from write to read and from read to write; an actuator for seek repositioning said head module from one data track to a target data track; a servo system for driving said actuator in a seek mode relating head acceleration to a control signal; a microprocessor for providing said control signal for said seek mode; and a power amplifier for driving said actuator in accordance with said control signal; the method comprising the steps of:

upon switching said head module from write to read or from read to write for the same cylinder, defining at least one control function for said control signal to drive said actuator to move said head module the distance between said side by side read and write transducers; and employing said defined control function to provide said control signal.

11. The method claim 10, wherein said defining step additionally comprises:

upon switching said head module from write to read, defining a control function for said control signal to drive said actuator to move said head module the distance between said side by side read and write transducers at the timing best suited to minimize the time between write and read; and upon switching said head module from read to write, defining a control function for said control signal to drive said actuator to move said head module the distance between said side by side read and write transducers at the timing best suited to minimize the write transition time from read to write.

12. The method of claim 11, wherein said controller also provides an indication of the angular location of the start of the data to be read or written upon said switch; and wherein:

said defining step additionally comprises defining two families of control functions, the first said family of functions optimized to minimize the time between write and read for selected angular distances between the ending of the data being written and the start of the data to be read, and the second said family of functions optimized to minimize the write transition time from read to write for selected angular distances between the ending of the data being read and the start of the data to be written; and comprising the additional steps of, in response to said write to read switching and to said indication of said angular location, selecting the one of said first family of control functions best suited to minimize the time between write and read; and, in response to said read to write switching and to said indication of said angular location, the one of said second family of control functions best suited to minimize the write transition time from read to write.

13. The method of claim 10, wherein said controller also provides an indication of the angular location of the start of the data to be read or written upon said switch; and wherein:

said defining step additionally comprises defining a family of control functions, said family of functions optimized to minimize the time between write and read for selected angular distances between the ending of the data being written and the start of the data to be read, and optimized to minimize the write transition time from read to write for selected angular distances between the ending of the data being read and the start of the data to be written; and comprising the additional steps of, in response to said head module switching and to said indication of said angular location, selecting the one of said family of control functions best suited to minimize the time between write and read or the write transition time from read to write.

14. The method of claim 10, wherein said defining step additionally comprises:

selecting a series of scaling factors which determine pulse amplitudes, which scaling factors have been previously designed and calculated and which optimize the write to read and write transition times; and scaling feedforward pulses by said scaling factors and adding said pulses to said control.

* * * * *